United States Patent [19]

Davis

[11] 4,161,475

[45] Jul. 17, 1979

[54] SULFURIZED MANNICH CONDENSATION PRODUCTS AND LUBRICANTS CONTAINING SAME

[75] Inventor: Kirk E. Davis, Euclid, Ohio

[73] Assignee: The Lubrizol Corporation, Wickliffe, Ohio

[21] Appl. No.: 834,618

[22] Filed: Sep. 19, 1977

Related U.S. Application Data

[63] Continuation-in-part of Ser. No. 656,228, Feb. 9, 1976, Pat. No. 4,090,854, which is a continuation-in-part of Ser. No. 528,189, Nov. 29, 1974, abandoned.

[51] Int. Cl.$^2$ ............................................. C07G 17/00
[52] U.S. Cl. ...................................... 260/132; 252/47; 252/475
[58] Field of Search .................. 252/47, 47.5, 402; 260/132

[56] References Cited

U.S. PATENT DOCUMENTS

| | | | |
|---|---|---|---|
| 2,459,114 | 1/1949 | Oberright | 252/42.7 |
| 2,459,116 | 1/1949 | Oberright | 252/42.7 |
| 3,390,086 | 6/1968 | O'Halloran | 252/47.5 |
| 3,658,496 | 4/1972 | Blaly et al. | 44/73 X |
| 3,676,346 | 7/1972 | Hu | 252/47.5 |
| 3,904,595 | 9/1975 | Plonsker et al. | 252/47.5 |
| 3,948,619 | 4/1976 | Worrel | 44/73 X |
| 4,025,451 | 5/1977 | Plonsker et al. | 252/47.5 |

*Primary Examiner*—Delbert E. Gantz
*Assistant Examiner*—Andrew Metz
*Attorney, Agent, or Firm*—James W. Adams, Jr.; Daniel N. Hall

[57] ABSTRACT

Sulfurized Mannich condensation products, made from phenolic compounds, aldehydes and amines, which have been further treated with elemental sulfur are improved additives for lubricants.

14 Claims, No Drawings

SULFURIZED MANNICH CONDENSATION PRODUCTS AND LUBRICANTS CONTAINING SAME

REFERENCE TO RELATED APPLICATIONS

This application is a continuation-in-part of U.S. Application Ser. No. 656,228 filed Feb. 9, 1976, now U.S. Pat. No. 4,090,854 issued May 23, 1978 which, in turn, is a continuation-in-part of U.S. Application Ser. No. 528,189, filed November 29, 1974, now abandoned.

BACKGROUND OF THE INVENTION

I. Field of the Invention

This invention relates to additives for lubricants made by treating a Mannich condensation product of a phenolic compound, aldehyde and amine with elemental sulfur. It also relates to lubricant compositions containing such additives.

II. Prior Art

The use of nitrogen-containing Mannich condensation products derived from phenols, aldehydes and amino compounds as additives for lubricants and normally liquid fuels is known to the art; see for example, U.S. Pat. Nos. 3,368,972 and 3,649,229. The formation of such additives using Mannich condensation reactions involving sulfur-containing reactants is also known to the art, see for example the following:

| U.S. PATENTS | |
|---|---|
| 3,335,201 | polysulfide-containing condensates |
| 3,368,972 | sulfur-bridged phenol condensates |
| 3,649,229 | sulfur-bridged phenol condensates |
| 3,458,495 | phospho-sulfurized hydrocarbon-treated Mannich condensates |
| 3,539,633 | thiourea condensates |
| 3,600,372 | $CS_2$-treated Mannich condensates |
| 3,649,659 | sulfonic or sulfuric acid-treated Mannich condensates |
| 3,741,896 | sulfurized phenol-treated Mannich condensates |

Treatment of acylated polyamines with elemental sulfur is also known to produce useful ashless dispersants for lubricating oils. See for example, U.S. Pat. No. 3,390,086.

The increasing demands for improved effectiveness of lubricants and normally liquid fuels with respect to engine emissions and economy as well as the increasingly severe conditions under which such materials are expected to perform has led to a continuing search for new additives. The present invention resides in the discovery that treatment of certain nitrogen-containing Mannich condensates with elemental sulfur produces additives for lubricants which endow the lubricant with improved oxidative and thermal stability. This allows greater latitude in the conditions under which these additives and compositions containing them can be stored and used. The inventive additives are particularly useful in lubricant compositions for use in automotive and truck automatic and manual transmission fluids, hydraulic fluids, hydrostatic fluids, power steering pump fluids and the like.

DETAILED DESCRIPTION OF THE INVENTION

This invention comprises a nitrogen-containing Mannich condensation product containing about 0.1 to about 20% sulfur by weight, based on the total weight of the improved product, said sulfur having been introduced into the product by sulfurizing with elemental sulfur a conventional nitrogen-containing Mannich condensation product useful as an additive for lubricants and normally liquid fuels. Preferably sulfurization introduces into the inventive product a maximum of about 10% and a minimum of about 0.5% sulfur. The invention also includes lubricants containing these improved sulfurized Mannich condensation products.

It must be noted that as used in this specification and the appended claims, the singular forms "a", "an" and "the" include plural referents unless the context clearly dictates otherwise. Thus, for example, reference to "a phenol" includes mixtures of phenols, reference to "a Mannich condensate" includes reference to mixtures of such condensates, reference to "an aldehyde" includes mixtures of aldehydes and so forth.

The nitrogen-containing Mannich condensation products which can be improved through the use of this invention and thus serve as starting materials for the improved products of this invention are well known to those of skill in the art. Typically they are made by reacting at least one active hydrogen compound such as a hydrocarbon-substituted phenol having at least one hydrogen atom bonded to an aromatic carbon atom, at least one aldehyde or aldehyde-producing material, most often formaldehyde or a formaldehyde precursor, and at least one amino or polyamine compound having at least one >NH group. The amino compounds are preferably primary or secondary mono-amines having substantially hydrocarbyl substituents of 1 to about 30 carbon atoms each or polyamines as hereinafter described. Exemplary mono-amines include methyl ethyl amine, methyl octadecyl amine, aniline, diethyl amine, morpholine, phenothiazine, diethanol amine, dipropyl amine, and so forth. The amino compound can also be an aromatic polyamine such as the phenylene and naphthylene diamines or hydrazines such as hydrazine itself and organo-hydrazines having hydrocarbon-based substituents of up to about 30 carbon atoms.

The Mannich condensates disclosed in the U.S. Pat. Nos. 3,368,972 and 3,649,229 noted hereinabove, as well as the Mannich condensates disclosed in the following U.S. patents, can serve as the starting materials for the improved, sulfurized, nitrogen-containing Mannich condensates of the present invention:

| U.S. PATENTS | | |
|---|---|---|
| 2,459,112 | 3,413,347 | 3,558,743 |
| 2,962,442 | 3,442,808 | 3,586,629 |
| 2,984,550 | 3,448,047 | 3,591,598 |
| 3,036,003 | 3,454,497 | 3,600,372 |
| 3,166,516 | 3,459,661 | 3,634,515 |
| 3,236,770 | 3,461,172 | 3,649,229 |
| 3,355,270 | 3,493,520 | 3,697,574 |
| 3,368,972 | 3,539,633 | |

These patents are incorporated by reference for their disclosures relating to Mannich condensate products which can serve as the starting materials of the improved sulfurized additive compositions of the present invention.

Mannich condensates made from sulfur-containing reactants can also be used as starting materials for making the improved products of the present invention. In these cases, additional sulfur is incorporated into the improved products in the amounts set forth hereinabove. A number of types of such sulfur-containing reactant-derived Mannich condensates have been described in the patents discussed hereinabove as prior art. These patents are hereby incorporated by reference for their disclosures relating to Mannich condensates.

Normally in the Mannich condensates preferred for making the sulfurized compositions of this invention the phenolic compound is phenol bearing a substantially hydrocarbyl substituent of about 6 to about 400 carbon atoms; usually this substituent is an aliphatic substituent of about 6 to about 400 carbon atoms. Typical phenols bear a single aliphatic substituent of about 12 to about 250 carbon atoms; usually this is a purely hydrocarbyl aliphatic substituent of about 30 to about 250 carbon atoms.

As used herein and in the appended claims, the term "substantially hydrocarbyl" denotes a substituent, radical or group having a carbon atom directly attached to the remainder of the molecule and having predominantly hydrocarbon character within the context of this invention. Such groups include the following:

(1) Hydrocarbon groups, that is aliphatic (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art; examples include (in addition to those noted hereinbefore) pentyl, neopentyl, cyclopentyl, etc., betaphenylethyl, phenylene, anthryl, tolyl, xylyl, decalinyl (e.g., 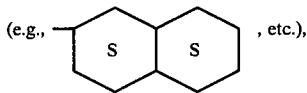, etc.), tetrahydronaphthyl and so forth.

(2) Substituted hydrocarbon groups, that is, groups containing non-hydrocarbon substituents which, in the context of this invention, do not alter the predominantly hydrocarbon character of the group. Those skilled in the art will be aware of suitable substituents such as:

pendant ether groups (especially hydrocarbyloxy and particularly alkoxy groups of up to ten carbon atoms)
cyano
fluoro
pendant thioether groups (especially $C_{1-10}$ alkyl thioethers such as methylmercapto, butyl-mercapto, etc.)
pendant hydrocarbyl sulfonyl groups ($-SO_2R'$ where $R'$ is a $C_{1-10}$ hydrocarbyl group)
carboxyl hydrocarbyl (e.g., $-C(O)OR'$, $R'$ being as above)
oxycarbo-hydrocarbyl (e.g., $-O(O)CR'$, $R'$ being as above)
pendant sulfinyl groups ($-S(O)R'$, $R'$ being as above)

Other such non-hydrocarbyl substituents will be apparent to those skilled in the art.

(3) Hetero groups, that is, groups which, while predominantly hydrocarbon in character within the context of this invention, contain atoms other than carbon present in a chain or ring otherwise composed of carbon atoms. Suitable hetero atoms will be apparent to those skilled in the art and include, for example, oxygen, sulfur (in both its oxidized and unoxidized forms) phosphorus and nitrogen. Such hetero groups include, for example, furyl, thienyl, pyranyl, and so forth.

In general, no more than about three substituents or hetero atoms, and preferably no more than one, will be present for each ten carbon atoms in the substantially hydrocarbyl radical.

In these preferred Mannich condensates the aldehyde is formaldehyde or a $C_{2-7}$ aliphatic-based aldehyde and the amino compound is selected from the group consisting of (1) polyalkylene polyamines of the general formula

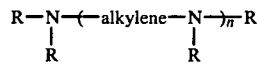

wherein each R is independently a hydrogen atom or a $C_{1-12}$ hydrocarbon-based group, with the proviso that at least one R is a hydrogen atom, n is a whole number of 1 to 10 and alkylene is a $C_{1-10}$ alkylene group, (2) heterocyclic-substituted polyamines of the formula

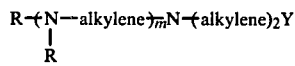

wherein R and alkylene are as defined hereinabove, m is 0 or a whole number of 1 to 10, and Y is an oxygen or divalent sulfur atom or $>N-R^*$ and $R^*$ is either a R or a

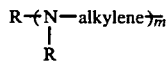

group and (3) aromatic polyamines of the general formula

wherein Ar is an aromatic nucleus (usually hydrocarbyl in nature) of 6 to about 20 carbon atoms, each R is as defined hereinabove and Y is 2 to about 8. Exemplary of the polyalkylene polyamines (1) are ethylene diamine, tetra(ethylene) pentamine, tri-(trimethylene) tetramine, 1,2-propylene diamine, etc. Exemplary of the heterocyclic-substituted polyamines (2) are N-2-aminoethyl piperazine, N-2- and N-3-aminopropyl morpholine, N-3-(dimethyl amino) propyl piperazine, etc. Exemplary of the aromatic polyamines (3) are the various isomeric phenylene diamines, the various isomeric naphthylene diamines, etc.

The preferred condensates are prepared by reacting about one molar portion of phenolic compound with about 0.5 to about 4 molar portions of aldehyde and about 1 to about 10 equivalent portions of amino compound (an equivalent of amino compound is its molecular weight divided by the number of =NH groups present). Usually about 1 molar portion of phenolic compound is reacted with about 1 to about 2 molar portions of aldehyde and about 2 to about 5 equivalents of amino compound. The reaction is carried out under the condition of Mannich condensation reactions which are well known to those of skill in the art as evidenced by the above-noted patents which are also incorporated by reference for their disclosures relating to reaction conditions.

The form of elemental sulfur used in preparing the improved sulfurized, nitrogen-containing Mannich condensates of the present invention is not critical; thus amorphous or crystalline sulfur in its various forms can be used. The sulfurization reaction is carried out until a minimum of about 0.1% sulfur is incorporated in the improved Mannich condensates (based on the total weight of the condensate). Generally, this will be accomplished in a reaction time of about 0.25 to about 24 hours. The rate of sulfur incorporation will naturally vary with the reaction temperature. Generally the reaction temperature will be in the range of from about 75° C. (when a sulfur solvent or promoter is used) to about 300° C. Preferably, the minimum reaction temperature will be about 150° C., and the maximum about 250° C.

The amount of sulfur used in the sulfurization reaction will range between about 0.1 and about 50% of the nitrogen-containing Mannich condensate. Preferably, a minimum of 1% and a maximum of 20% is used. The sulfur used in the reaction can either be added all at the beginning of the reaction or in stages during the course of the reaction as long as the total amount added falls within the hereinbefore given ranges. The sulfurization reaction can be carried out by merely mixing the elemental sulfur and nitrogen-containing condensate in the absence of the other materials. Preferably, however, it is carried out in the presence of an inert liquid solvent/diluent, which can be an oil as hereinafter described, or a lower molecular weight material such as benzene, diphenylether, etc., which is substantially inert to reaction with sulfur and the Mannich condensate under the reaction conditions. Selection of suitable solvent/diluents is within the ordinary skill of the art. Sulfurization promoters such as dimethylformamide and dimethyl sulfoxide can be used; when used, the reaction temperature can be lowered to about 75° C.

It is usually desirable to carry out sulfurization reaction in the presence of an oil which later can be incorporated in the lubricant of this invention. This eliminates any need for removing the sulfurized product from the inert solvent/diluent. Where it is desired to incorporate relatively high levels of sulfur in a nitrogen-containing Mannich condensate, such as about 5 to about 10%, it is helpful to carry out the reaction in the presence of a catalyst, such as a rubber vulcanization catalyst such as, for example, zinc stearate, zinc oxide, etc. Lower levels of sulfur, however, can be incorporated easily without the presence of a catalyst.

The following examples describe certain specific embodiments of the invention, but they do not in any way limit the scope of the invention defined by the appended claims. In these examples, all number average molecular weights ($\bar{M}n$) are determined by vapor pressure osmometry and all weight average molecular weights ($\bar{M}w$) by gel permeation chromatography unless expressly stated to the contrary. All "mm's" refer to millimeters of mercury vacuum.

EXAMPLE 1(a)

Benzene (217 parts) is added to phenol (324 parts, 3.45 moles) at 38° C. and the mixture is heated to 47° C. Boron trifluoride (8.8 parts, 0.13 mole) is added to the mixture over a one-half hour period at 38°–52° C. Polyisobutene (1000 parts, 1.0 mole) derived from the polymerization of $C_4$ monomers predominating in isobutylene is added to the mixture at 52°–58° C. over a 3.5 hour period. The mixture is held at 52° C. for one additional hour. A 26% solution of aqueous ammonia (15 parts) is added and the mixture heated to 70° C. over a two-hour period. The mixture is then filtered and the filtrate is the desired crude polyisobutene-substituted phenol. This intermediate is stripped by heating 1465 parts to 167° C. and the pressure is reduced to 10 mm as the material is heated to 218° C. in a 6-hour period. A 64% yield of stripped polyisobutene-substituted phenol ($\bar{M}n$=885) is obtained as the residue.

EXAMPLE 1(b)

A commercial mixture of ethylene polyamines (41 parts, 1.0 equivalent) corresponding in empirical formula to penta(ethylene)hexamine is added to a mixture of the substituted phenol (400 parts, 0.38 equivalent) described in Example 1(a) and diluent oil (181 parts) at 65° C. The mixture is heated to 93° C. and paraformaldehyde (12 parts, 0.4 equivalent) added. The mixture is heated from 93°–140° C. over a 5-hour period and then held at 140° C. for 4 hours under nitrogen. The mixture is cooled to 93° C. and additional paraformaldehyde (12 parts, 0.4 equivalent) is added. The mixture is heated from 93°–160° C. for a total of 12 hours. The total amount of distillate collected is 13.2 parts. An additional amount of diluent oil (119 parts) is added to the mixture which is then filtered. The filtrate is a 40% oil solution of the desired Mannich condensation product containing 1.87% nitrogen.

EXAMPLE 1(c)

To 1850 parts (1.0 equivalent) of the Mannich condensate described in Example 1(b) is added sulfur flowers (64 parts, 2.0 equivalents) at 80° C. The mixture is heated to 160° C. over a 10-hour period removing the hydrogen sulfide evolved (35 grams). The mixture is then filtered. The filtrate is a 40% oil solution of the desired sulfurized product containing 1.79% nitrogen and 1.43% sulfur.

EXAMPLE 2

The procedure of Example 1 is repeated except the polyisobutene-substituted phenol used has a $\bar{M}w$=4084/$\bar{M}n$=1292. To this substituted phenol (1400 parts, 0.75 equivalent) and diluent oil (374 parts) is added the ethylene polyamine of Example 1(b) (77 parts, 1.85 equivalents) at 80° C. The mixture is heated to 96° C. and sulfur flowers (42.7 parts, 1.33 equivalents) and paraformaldehyde (22.5 parts, 0.75 equivalent) is added. The mixture is heated to 150° C. over 3 hours under nitrogen. A total of 5 parts distillate is removed. The mixture is cooled to 120° C. and additional paraformaldehyde (22.5 parts, 0.75 equivalent) is added. The mixture is held at 120°–125° C. for one hour and then heated to 165° C. for 5 hours. An additional 12 parts distillate is removed. The mixture is filtered to provide as a filtrate a 20% oil solution of the desired product containing 0.83% nitrogen and a 0.27% sulfur.

EXAMPLE 3

A 37% aqueous solution of formaldehyde (55 parts, 0.68 equivalent) is added to Ethyl Antioxidant 733 (148 parts, 0.68 equivalent), a commercially available isomeric mixture of butyl-substituted phenols available from the Ethyl Corp., a 25% aqueous solution of dimethylamine (122 parts, 0.68 equivalent) and isopropanol (148 parts) as solvent. The mixture is heated to 75° C. and held for 1.67 hours. The mixture is allowed to stand and separate into two layers. The aqueous layer is removed and the organic layer washed twice with water. Sulfur flowers (44 parts, 1.36 moles), along with dimethyl formamide (148 parts) used as a sulfurization promoter, is added and the mixture heated to 150° C. over 3 hours. The mixture is then filtered. Benzene is added and the filtrate water washed three times. The filtrate is then stripped to 90° C./15 mm. The residue is the desired product containing 2.8% nitrogen and 13.98% sulfur.

EXAMPLE 4

A mixture of isomeric heptyl phenols (400 parts, 2.0 moles), 91% aqueous paraformaldehyde (66 parts, 2.0 moles), dodecylaniline (522 parts, 2.0 moles), diluent oil (673 parts) and benzene (200 parts) is refluxed to 131° C. over 7 hours removing 42 parts water. The mixture is cooled to 105° C. and sulfur flowers (128 parts, 4.0 moles) along with dimethyl formamide (100 parts) is added. The mixture is then heated to 175° C. over a 15 hour period removing hydrogen sulfide (64 parts) in a caustic trap. The mixture is then stripped to 170° C./30 mm. The residue is filtered and the filtrate is a 40% oil solution of the desired product containing 1.80% nitrogen and 2.6% sulfur.

EXAMPLE 5(a)

A mixture of an alkylated phenol (1094 parts, 2.0 moles based on phenolic hydroxy group determination) having substituents of $\bar{M}n = 300$, 91% aqueous paraformaldehyde (66 parts, 2.0 moles), p-phenylene diamine (108 parts, 1.0 mole) and toluene (250 parts) is heated to 155° C. over a 4-hour period removing 43 parts water along with toluene. The mixture is then stripped to 150° C./20 mm. and diluent oil (803 parts) is added. The residue is filtered to provide as a filtrate the desired intermediate containing 1.33% nitrogen.

EXAMPLE 5(b)

A mixture of the intermediate prepared in Example 5(a) (510 parts, 0.25 mole), sulfur flowers (32 parts, 1.0 mole), diluent oil (16 parts) and dimethyl formamide (100 parts) is heated for 10 hours at 140°–165° C. removing hydrogen sulfide (17 parts) in a caustic trap. The mixture is stripped to 185° C./22 mm. The residue is then filtered. The filtrate is a 40% oil solution of the desired product containing 1.50% nitrogen and 2.11% sulfur.

EXAMPLE 6

A mixture of an alkylated phenol (565 parts, 1.0 equivalent based on phenolic hydroxyl group determination) in which alkyl groups are of $\bar{M}n = 300$, paraformaldehyde (45 parts, 1.5 moles), hydrazine monohydrate (75 parts, 1.5 moles), diluent oil (469 parts) and hydrochloric acid (0.1 part) is heated to 110° C. for 2.5 hours. The mixture is then heated to 150°–160° C. for 2 hours removing 100 parts distillate. Sulfur flowers (64 parts, 2.0 moles) is added and the mixture heated to 185° C. and held there for 13 hours while a total of 30 parts hydrogen sulfide is collected in a caustic trap. The mixture is filtered at 150° C. to provide as a filtrate a 40% oil solution of the desired product containing 0.60% nitrogen and 2.67% sulfur.

EXAMPLE 7(a)

To a mixture of an alkylated phenol (798 parts, 3.0 equivalents based on phenolic hydroxyl group determination) having the alkyl groups derived from polypropylene tetramer, a 25% aqueous solution of dimethyl amine (558 parts, 3.1 equivalents) and isopropanol (500 parts) is added a 37% aqueous formaldehyde solution (243 parts, 3.0 equivalents) at room temperature. The mixture is heated to 75° C. over 4 hours and then allowed to stand and separate. The aqueous layer is removed and the organic layer is stripped to 120° C./12 mm. The residue is filtered and the filtrate is the desired intermediate containing 4.25% nitrogen.

EXAMPLE 7(b)

A mixture consisting of the intermediate prepared in Example 7(a) (495 parts, 1.5 equivalents), sulfur flowers (96 parts, 3.0 equivalents) and dimethylformamide (250 parts) is heated to 167° C. over 4.75 hours; hydrogen sulfide (51 parts) is collected in a caustic trap. The mixture is then stripped to 153° C./8 mm. Diluent oil (300 parts) is added and the mixture filtered. The filtrate is a 36% oil solution of the desired product containing 1.94% nitrogen and 5.85% sulfur.

EXAMPLE 8

A mixture consisting of 206 parts (1.0 mole) of a di-tertiary butylphenol commercially available from the Ethyl Corp., as Ethyl AO-701, 272 parts (1.0 mole) oleyl amine commercially available from the Armour Corp. as "Armeen O", 33 parts (1.0 mole) of 91% paraformaldehyde and 200 parts benzene is heated to reflux for 3.5 hours removing 23 parts water. Sulfur flowers (61 parts, 1.9 moles) and 100 parts dimethylformamide is added and the mixture heated to 162° C. over 5 hours removing 12 parts hydrogen sulfide in a caustic trap. The mixture is then stripped to 160° C./10 mm. The residue is filtered. the filtrate is the desired product containing 2.74% nitrogen and 5.40% sulfur.

EXAMPLE 9(a)

A 37% aqueous solution of formaldehyde (243 parts, 3.0 moles) is added to a mixture consisting of an alkylated phenol (798 parts, 3.0 moles based on phenolic hydroxyl group determination) whereby the alkyl group is derived from a propylene tetramer, morpholine (270 parts, 3.1 moles) and 500 parts isopropanol. The mixture is heated to 75° C. over 3.5 hours and then stripped to 130° C./10 mm. The residue is filtered. The filtrate is the desired intermediate containing 3.82% nitrogen.

EXAMPLE 9(b)

A mixture consisting of the intermediate prepared in 9(a) (732 parts, 2.0 moles), sulfur flowers (128 parts, 4.0 moles) and dimethylformamide (370 parts is heated to 167° C. for 5 hours removing hydrogen sulfide (68 parts) in a caustic trap. The mixture is then stripped to 155° C./5 mm. To the residue, diluent oil (528 parts) is added and the mixture is then filtered. The filtrate is a 40% oil solution of the desired product containing 1.99% nitrogen and 4.73% sulfur.

As previously indicated, the sulfurized Mannich condensate compositions of this invention are useful as additives for lubricants, in which they function primarily as sludge dispersants. They can be employed in a variety of lubricants based on diverse oils of lubricating viscosity, including natural and synthetic lubricating oils and mixtures thereof. These lubricants include crankcase lubricating oils for spark-ignited and compression-ignited internal combustion engines, including automobile and truck engines, two-cycle engines, aviation piston engines, marine and railroad diesel engines, and the like. They can also be used in gas engines, jet aircraft turbines, stationary power engines and turbines and the like. Especially preferred lubricants containing the compositions of this invention are hydrostatic fluids, power steering pump fluids, automatic transmission fluids, transaxle lubricants, gear lubricants, and hydraulic fluids. Other lubricating oil and grease compositions can also benefit from the incorporation therein of the compositions of the present invention.

Natural oils include animal oils and vegetable oils (e.g., castor oil, lard oil) as well as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$-$C_8$ fatty acid esters, or the $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-2-tetraethyl)silicate, tetra-(p-tert-butylphenyl)silicate, hexyl-(4-methyl-2-pentoxy) disiloxane, poly(methyl)siloxanes, poly-(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils (and mixtures of each with each other) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques are known to those of skill in the art such as solvent extraction, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally, the lubricant compositions of the present invention contain an amount of the sulfurized Mannich condensate composition of this invention sufficient to provide it with sludge-dispersing properties. Normally, this amount will be about 0.5 to about 20%, preferably about 1 to about 10% of the total weight of the lubricant. In lubricating oils operated under extremely adverse conditions, such as lubricating oils for marine diesel engines, the reaction products of this invention may be present in amounts of up to about 30% by weight. Lubricating oil compositons based on liquid petroleum oils are preferred.

The lubricant compositions of the present invention can contain, in addition to the sulfurized Mannich condensate compositions of this invention, other additives that are normally used in lubricants. Such additives include, for example, auxiliary detergents of the ash-forming (e.g., neutral and overbased salts of organo acids) and of the ashless type, supplementary viscosity index improving agents, pour point depressants, antifoam agents, extreme pressure agents, rust-inhibiting agents, oxidation- and corrosion-inhibiting agents.

The lubricants of this invention are exemplified by the following:

EXAMPLE A

A lubricating oil containing as a basestock 93.5% of a paraffinic, solvent-refined mineral oil having a viscosity of 100 SUS at 37°, 2.5% of commercial poly(hexyl/octadecyl)acrylate V.I. improver and 4% of the product solution described in Example 7(b).

The additive and lubricant compositions of this invention have been specifically exemplified hereinabove to aid those skilled in the art in understanding and practicing the invention. Many obvious variations and departures from these specific teachings will be apparent to those of skill in the art based on principles and disclosures herein and in the prior art. Such variations and departures are contemplated as being within the scope of the present invention unless clearly excluded by the appended claims.

What is claimed is:

1. A sulfurized Mannich condensation product containing about 0.1 to about 20% sulfur by weight, based on the total weight of the product, said sulfur having been introduced into the product by sulfurizing with elemental sulfur a nitrogen-containing Mannich condensation product made from a phenol bearing a substantially hydrocarbyl substituent of about 6 to about 400 carbon atoms, formaldehyde, a formaldehyde precursor or a $C_{2-7}$ aliphatic-based aldehyde and an amino compound selected from the group consisting of (1) heterocyclic-substituted polyamines of the formula

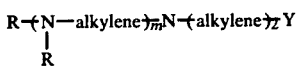

wherein each R is independently a hydrogen atom or a $C_{1-12}$ substantially hydrocarbyl group with the proviso that at least one R is a hydrogen atom and alkylene is a $C_{1-10}$ alkylene group, m is a whole number of 1 to 10, and Y is an oxygen, divalent sulfur atom or —N—R* and R* is either a R or a

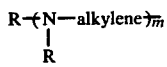

group and (2) aromatic amines selected from the group consisting of aniline, alkyl-substituted anilines, phenothiazine and aromatic polyamines of the general formula

wherein Ar is an aromatic nucleus of 6 to about 20 carbon atoms, each R is as defined hereinabove, and y is 2 to about 8.

2. A condensation product as claimed in claim 1 wherein the substantially hydrocarbyl substituent is an aliphatic substituent of about 12 to about 250 carbon atoms.

3. A condensation product as claimed in claim 2 wherein the substantially hydrocarbyl substituent is a purely aliphatic substituent of about 30 to about 250 carbon atoms.

4. A condensation product as claimed in claim 1 wherein the amino compound is (3) an aromatic polyamine.

5. A condensation product as claimed in claim 1 wherein the aldehyde is formaldehyde or a formaldehyde precursor.

6. A condensation product as claimed in claim 1 wherein the amino compound is (1) a heterocyclic-substituted polyamine.

7. A condensation product as claimed in claim 6 wherein the polyamine is N-2-aminoethyl piperazine, N-2-aminopropyl morpholine, N-3-aminopropyl morpholine, N-3-(dimethyl amino)propyl piperazine and mixtures of two or more of these.

8. A condensation product as claimed in claim 6 wherein the aldehyde is formaldehyde or a formaldehyde precursor.

9. A condensation product as claimed in claim 7 wherein the aldehyde is formaldehyde or a formaldehyde precursor.

10. A condensation product as claimed in claim 1 wherein the amino compound (2) is an aromatic amine.

11. A condensation product as claimed in claim 10 wherein the aldehyde is formaldehyde or a formaldehyde precursor.

12. A condensation product as claimed in claim 10 wherein the amine is (2) aniline, alkyl-substituted aniline and mixtures of these.

13. A condensation product as claimed in claim 10 wherein the amine is (2) an aromatic polyamine.

14. A condensation product as claimed in claim 13 wherein the aldehyde is formaldehyde or a formaldehyde precursor.